J. R. GAMMETER.
STUFFING BOX FOR BALLOON CORDS.
APPLICATION FILED APR. 22, 1918.

1,287,285.  Patented Dec. 10, 1918.

INVENTOR.
John R. Gammeter
BY Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

STUFFING-BOX FOR BALLOON-CORDS.

1,287,285.  Specification of Letters Patent.  Patented Dec. 10, 1918.

Application filed April 22, 1918. Serial No. 229,941.

*To all whom it may concern:*

Be it known that I, JOHN R. GAMMETER, a citizen of the United States, residing at Akron, in the county of Summit and State of Ohio, having invented a certain new and useful Stuffing-Box for Balloon-Cords, of which the following is a specification.

This invention has for its principal object to provide a substantially fluid-tight guide and stuffing-box for a flexible cord used on a ballooon, such as the pull-cord for the rip-panel, at the point where said cord passes through the wall of the gas bag or envelop. The invention may, however, be employed in any analogous or appropriate situation.

Of the accompanying drawings.

Figure 1:
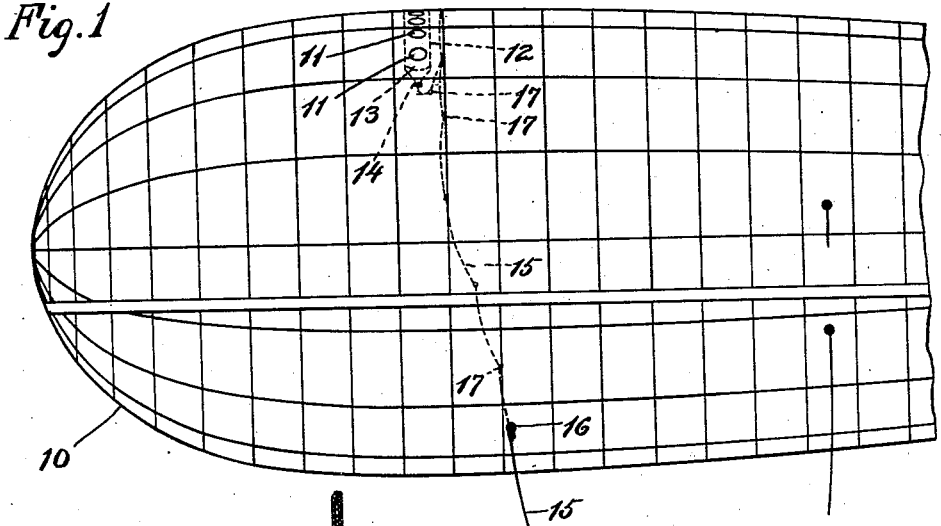
Figure 1 is a side elevation of one end of a balloon envelop, showing the general arrangement of the rip-panel and cord.
Figure 2:
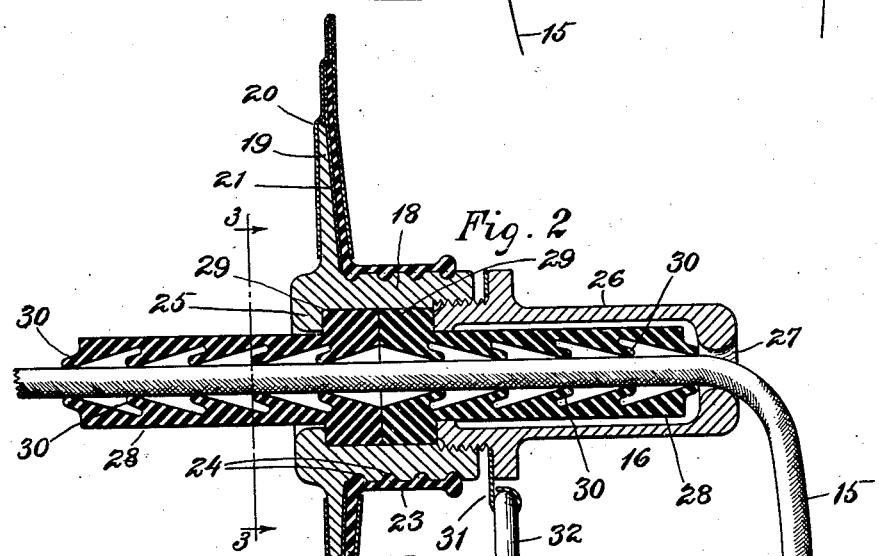
Fig. 2 is a longitudinal sectional view showing a guide or stuffing-box embodying my invention, together with the cord passing therethrough.
Figure 3:
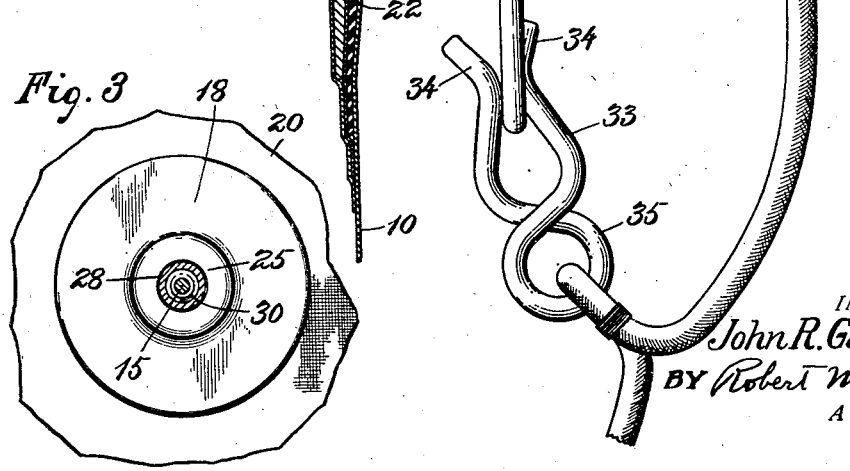
Fig. 3 is a cross-section on the line 3—3 of Fig. 2.

In the drawings, 10 is the balloon envelop or gas bag having a row of emergency outlets 11 on top, controlled by the usual rip-panel 12 which is arranged on the inside on a transverse arc, 13 being the near end and 14 the remote end of said panel. The rip-cord 15 leads from the outside through a guide or stuffing-box 16 into the interior of the balloon, and is carried across adjacent to the wall of the envelop through a series of guide-rings 17 to the remote end 14 of the rip-panel.

The stuffing-box structure comprises a metal casing 18, 26 and a pair of soft-rubber packing sleeves 28. The short, tubular body 18 is formed with a base-flange 19 located on the inner side of the wall of the balloon envelop, and said flange is faced with fabric disks 20, 21 cemented thereto, there being a soft-rubber packing disk 22 interposed between the outer fabric disk 21 and the inner side of the envelop 10, cemented to both fabric surfaces and formed with a collar 23 which embraces the cylindrical part of the metal body 18, said collar and body being formed with interfitting grooves and ribs as indicated at 24.

The inner end of the body 18 is formed with an annular ledge or shoulder 25, and into its outer end is screwed the tubular gland or sleeve 26, the outer end of the latter having a flaring eye or guide aperture 27 for the cord. The two packing sleeves 28, composed of vulcanized soft rubber, are formed with cylindrical base enlargements or flanges 29 which are held under compression, in abutting relation, in the central cavity of the body 18, between the shoulder 25 and the inner end of the gland 26. Each of these sleeves is internally molded with a series of integral, flexible, spaced, annular, free-edged packing lips, ribs or flanges 30, each, in the preferred form here shown, having a general conical form and making an acute angle with the axis of the cord so that the latter will slide through the lips in either direction without snubbing or catching thereon. Each lip preferably bears against the cord with only a light pressure of its own, and there are a sufficient number of the lips to provide a tight packing without an excessive amount of friction. The lips on the inner sleeve 28 are directed axially inward and those on the outer sleeve 28 are directed axially outward, so that either the gas pressure within the balloon or the atmospheric pressure on the outside (according to which predominates) will tend to compress the said lips against the cord 15 and prevent any substantial amount of leakage either way.

I prefer to support the weight of the external suspended part of the cord 15 directly from the stuffing-box 16, and for this purpose I show on the metal sleeve 26 a plate 31 to which is hinged a ring 32, said ring supporting an open-sided link 33 having spring legs 34 which embrace the ring and an eye 35 at its lower end to which a loop in the cord is connected, this link being snapped off by a sharp pull on the cord when it is desired to open the rip-panel 12.

I believe myself to be the first to provide a balloon-cord packing composed of a series of spaced, soft flanges severally slanted in the same direction so as to secure substantial fluid-tightness with low friction, and I therefore do not wholly confine myself to details such as making these flanges integral with each other, or the particular shape of these flanges, or the employment of two series of oppositely-slanted flanges, although these features are preferred.

I claim:

1. The combination, with the gas receptacle of a balloon, of a cord passing through the wall of said receptacle, and a cord stuffing-box mounted on said wall and having packing means comprising a series of soft, annular, packing flanges slidingly surrounding the cord and severally slanted in the same direction.

2. A cord packing sleeve composed of vulcanized soft rubber and provided internally with a series of similarly slanted annular, substantially conical packing flanges surrounding the cord aperture.

3. A cord packing sleeve composed of vulcanized soft rubber and formed internally with a series of integral, annular cord-engaging cones whose walls make acute angles with the axis of said sleeve.

4. The combination, with the gas receptacle of a balloon, of a cord passing through the wall of said receptacle, and a soft-rubber packing mounted on said wall and surrounding the cord, said packing including a series of annular, substantially conical packing lips embracing the cord and directed axially inward so as to be tightened thereon by the internal gas pressure.

5. The combination, with the gas receptacle of a balloon, of a cord passing through the wall of said receptacle, and a soft-rubber packing mounted on said wall and surrounding the cord, said packing including a series of annular, substantially conical packing lips embracing the cord and directed axially outward so as to be tightened thereon by the external atmospheric pressure.

6. A cord stuffing-box comprising a casing having an annular shoulder and a removable gland, and two soft-rubber packing sleeves held between said shoulder and gland, said sleeves each being formed with a series of integral, annular packing cones, the small ends of the cones in the respective sleeves being directed away from each other.

7. The combination, with the gas receptacle of a balloon, of a cord passing through the wall of said receptacle, and a cord stuffing-box mounted on said wall and comprising a casing whose outer member is a removable gland formed with a terminal eye or cord-guide, and a pair of soft-rubber packing sleeves mounted in said casing, the inner sleeve having a series of packing cones directed axially inward, and the outer sleeve having a series of packing cones directed axially outward.

8. The combination, with the gas receptacle of a balloon, of a cord passing through the wall of said receptacle, a cord stuffing-box mounted on said wall and comprising a casing, cord-packing means in said casing, and cord-suspending means on the external part of the casing including spring-retained members adapted to be separated by a pull on the cord.

In testimony whereof I have hereunto set my hand this seventeenth day of April, 1918.

JOHN R. GAMMETER.